(12) United States Patent
Hung

(10) Patent No.: US 7,014,445 B2
(45) Date of Patent: Mar. 21, 2006

(54) INJECTION-MOLDING TOOL FOR A GOLF CLUB GRIP

(75) Inventor: Chi-Chih Hung, Kaohsiung Hsien (TW)

(73) Assignee: Eing Nan Rubber Co., Ltd., Kaohsiung Hsien (TW)

(*) Notice: Subject to any disclaimer, the term of this patent is extended or adjusted under 35 U.S.C. 154(b) by 240 days.

(21) Appl. No.: 10/633,416

(22) Filed: Aug. 4, 2003

(65) Prior Publication Data
US 2005/0031722 A1 Feb. 10, 2005

(51) Int. Cl.
*B29C 45/10* (2006.01)

(52) U.S. Cl. ............... 425/183; 425/184; 425/190; 425/192 R; 425/577

(58) Field of Classification Search .......... 425/182, 425/183, 184, 190, 192 R, 577; 249/175, 249/176, 177
See application file for complete search history.

(56) References Cited

U.S. PATENT DOCUMENTS

| 3,384,335 | A | * | 5/1968 | Schwarz | 249/176 |
| 5,178,711 | A | * | 1/1993 | Lu | 264/523 |
| 6,623,678 | B1 | * | 9/2003 | Anderson | 264/232 |
| 6,790,029 | B1 | * | 9/2004 | Downey | 425/577 |

* cited by examiner

*Primary Examiner*—Tim Heitbrink
(74) *Attorney, Agent, or Firm*—Birch, Stewart, Kolasch & Birch, LLP

(57) ABSTRACT

An injection-molding tool for a golf club grip includes a base member and a detachable molding member attached thereto. The base member is provided with a screw rod extended therefrom for screw connection. The detachable molding member includes a screw hole for receiving the screw rod of the base member, and a plurality of molding plugs extended therefrom and disposed around the screw hole. Each of the molding plugs has a cross-sectional configuration to thereby form a desired type of a structural elastic buffer of the golf club grip.

9 Claims, 5 Drawing Sheets

INJECTION-MOLDING TOOL FOR A GOLF CLUB GRIP

BACKGROUND OF THE INVENTION

1. Field of the Invention

The present invention is related to an injection-molding tool for a golf club grip. More particularly, the present invention is related to an injection-molding tool for a golf club grip having a detachable molding member for manufacturing various structural elastic buffers of the golf club grip.

2. Description of the Related Art

Referring initially to FIG. 1, a conventional injection-molding tool 10 is connected to an injection molding machine 1 in proper and applied to mold a golf club grip 20. Generally, the injection-molding tool 10 is provided with an axial rod 11 projected inwardly therefrom. In the molding process, the axial rod 11 is extended through the golf club grip 20 to thereby form with a closed end 21 and a central aperture 22 on the golf club grip 20. The golf club grip 20 is regarded as a hollow body that provides an accommodation for an end of a golf club shaft (not shown). Functionally, the central aperture 22 allows air-exhaustion from an interior of the golf club grip 20 in which inserting a golf club shaft. By use such a central aperture 22 of the golf club grip 20, it can facilitate an assembling process for insertion of a golf club shaft into the golf club grip.

In technical practice, the golf club grip 20 is generally made of rubber to thereby minimize vibration during striking a golf ball. To further eliminate vibration of the golf club for striking, the golf club grip 20 must provide with a structural elastic buffer. Accordingly, there is a need for improving the construction of the golf club grip 20. To this end, there is also a need for an injection-molding tool for manufacturing the structural elastic buffer of the golf club grip.

The present invention intends to provide an injection-molding tool for a golf club grip which includes a detachable molding member for manufacturing various structural elastic buffers of the golf club grip. The detachable molding member can be changed according to design choice of the structural elastic buffers in such a way to mitigate and overcome the above problem.

SUMMARY OF THE INVENTION

The primary objective of this invention is to provide an injection-molding tool for a golf club grip which includes a detachable molding member for facilitating injection-molding process. Thereby, various structural elastic buffers of the golf club grip can be manufactured conveniently.

The secondary objective of this invention is to provide the injection-molding tool for a golf club grip which includes a detachable molding member for manufacturing various structural elastic buffers. Thereby, the detachable molding member can be changed according to design choice of the structural elastic buffers.

The injection-molding tool for a golf club grip in accordance with the present invention includes a base member and a detachable molding member attached thereto. The base member is provided with a screw rod extended therefrom for screw connection. The detachable molding member includes a screw hole for receiving the screw rod of the base member, and a plurality of molding plugs extended therefrom and disposed around the screw hole. Each of the molding plugs has a cross-sectional configuration to thereby form a desired type of a structural elastic buffer of the golf club grip. The structural elastic buffer of the golf club grip is used to eliminate vibration of striking a golf ball.

Another aspect of the present invention is the base member provided with an aligning means, such as a cut portion, for positioning the injection-molding tool with respect to an injection-molding machine.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
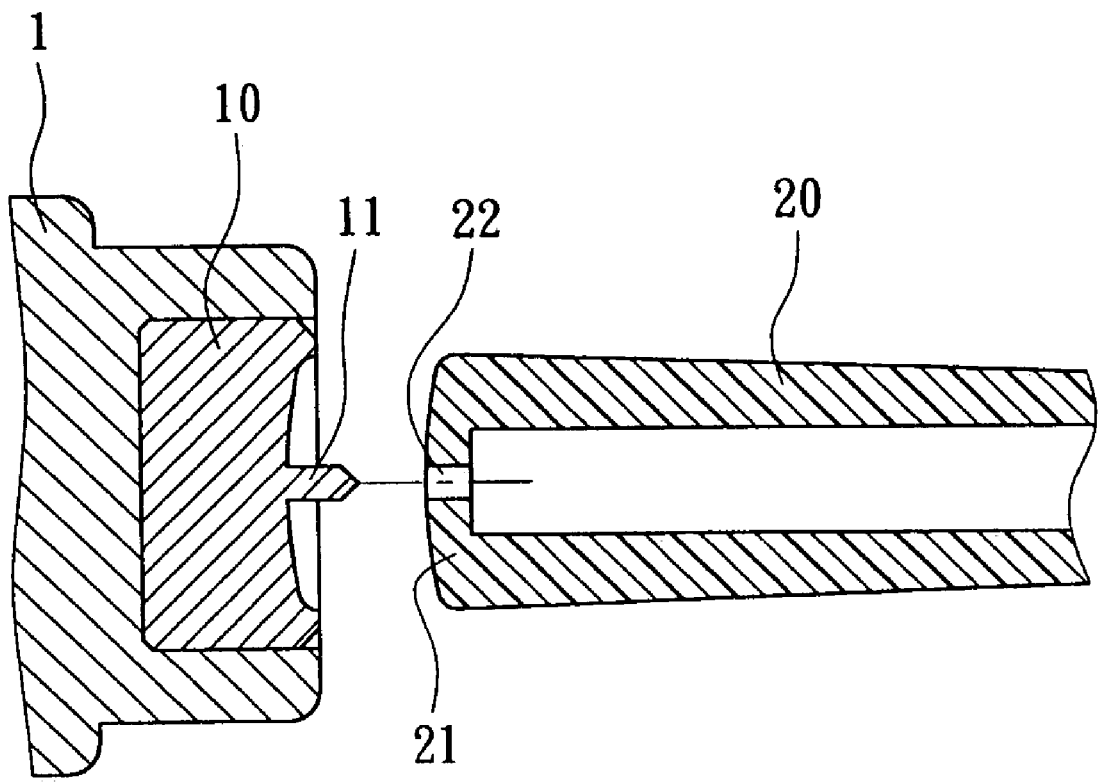
FIG. 1 is an exploded cross-sectional view of a conventional injection-molding tool for a golf club grip in accordance with the prior art.

Referring now to the drawings, there are three embodiments of the present invention shown therein, which include generally a primary base member, a secondary detachable molding member.

Referring to FIGS. 2 through 6, reference numerals of the first through third embodiments have applied the identical numerals of the conventional injection-molding tool. The injection-molding tools of the first through third embodiments have the similar configuration and same function as that of the conventional injection-molding tool and the detailed descriptions are omitted.

Figure 2:
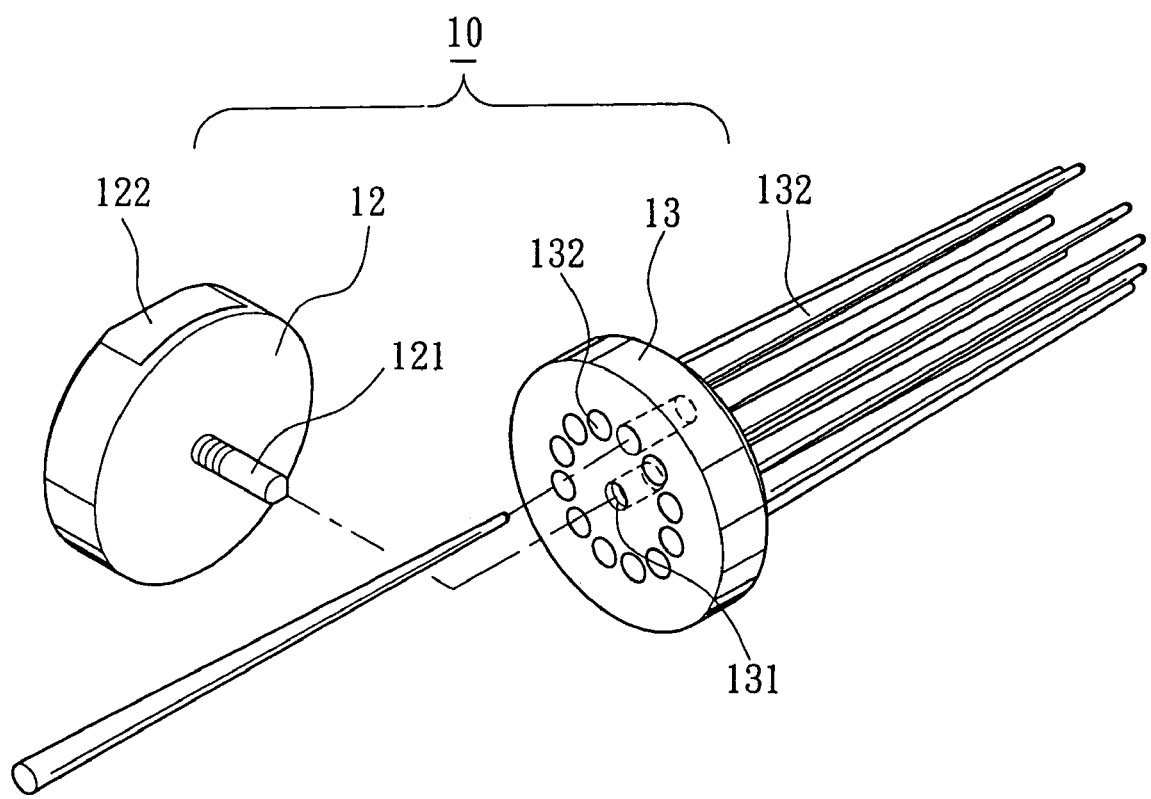
FIG. 2 is an exploded perspective view of an injection-molding tool for a golf club grip in accordance with a first embodiment the present invention.
Figure 3:
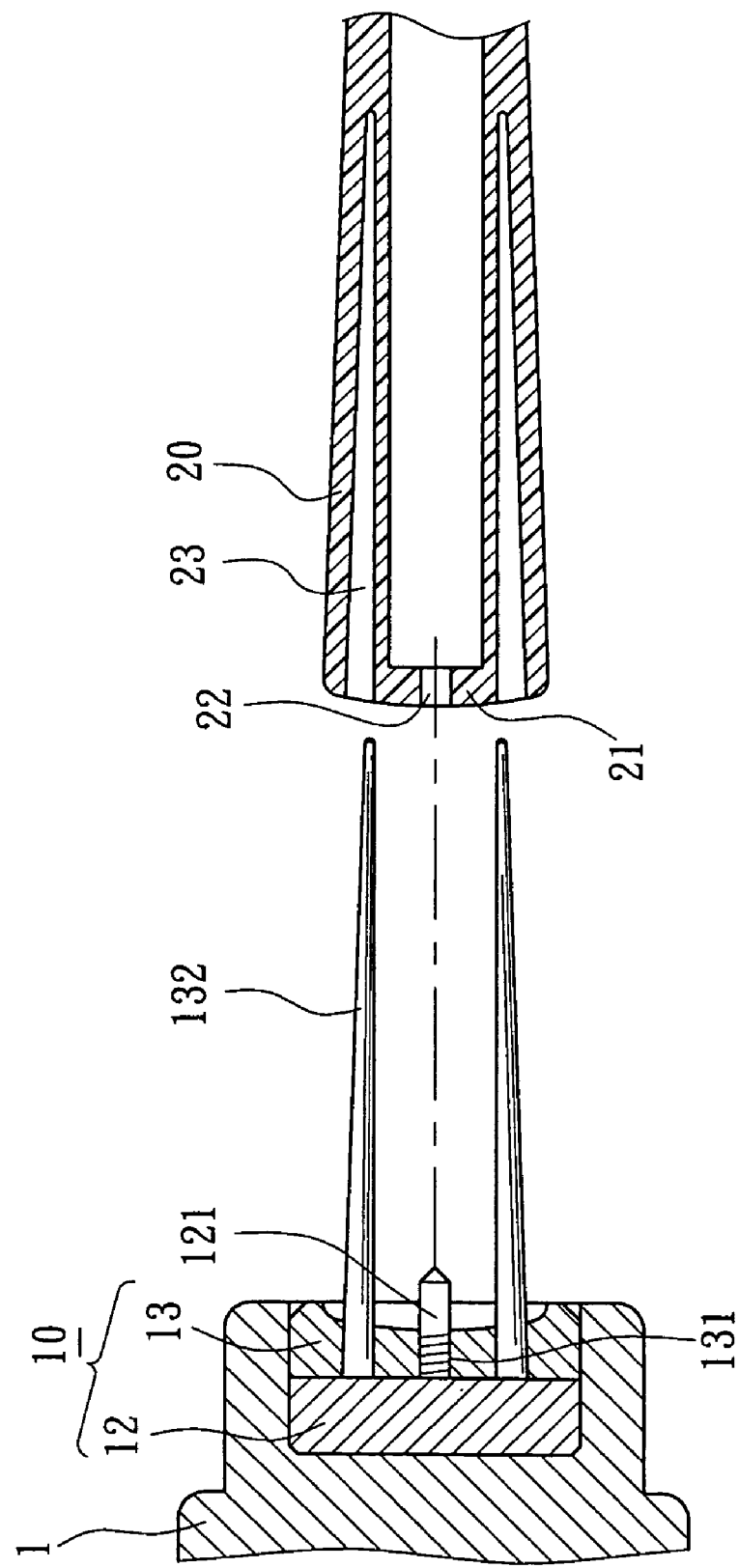
FIG. 3 is an exploded cross-sectional view of the injection-molding tool drawing out the golf club grip in accordance with the first embodiment of the present invention.

Referring to FIGS. 2 and 3, an injection-molding tool 10 for a golf club grip in accordance with a first embodiment of the present invention includes a base member 12 and a detachable molding member 13 attached thereto. The injection-molding tool 10 is combined with an end of an injection-molding machine 1, and inserted into a mold assembly (not shown).

Construction of the base member 12 shall be described in detail, referring again to FIGS. 2 and 3. The base member 12 is a circular plate that is preferably made of metal or the likes. The base member 12 is provided with a screw rod (axial rod) 121 extended therefrom for screw connection. Preferably, the base member 12 is further provided with a cut portion 122 regarded as an aligning means. In assembling operation, the cut portion 122 is adapted to align the base member 12 with the injection-molding machine 1.

Construction of the detachable molding member 13 shall be described in detail, referring again to FIGS. 2 and 3. Preferably, the detachable molding member 13 is made of metal or the likes, and formed with a bottom seat. The bottom seat of the detachable molding member 13 includes a screw hole (assembling hole) 131 for receiving the screw rod 121 of the base member 12, and a plurality of molding plugs 132 extended therefrom. The molding plugs 132 of the detachable molding member 13 are equi-spaced and disposed around the screw hole 131. Each of the molding plugs 132 has a circular cross-sectional configuration to thereby form a desired type of a structural elastic buffer of the golf club grip 20, as shown in FIG. 3.

Referring again to FIG. 3, in assembling operation, the base member 12 is coaxially aligned with the detachable molding member 13 which can be changed according to design choice of the structural elastic buffer of the golf club grip 20. The screw rod 121 of the base member 12 has a distal end extended through the screw hole 131 of the detachable molding member 13 and located among the molding plugs 132 of the detachable molding member 13. Consequently, the assembled relationship of the base member 12 and the detachable molding member 13 is simplified. In molding process, an elastic material is injected into the mold assembly (not shown) through the injection-molding tool 10 so that the golf club grip 20 is molded.

Referring again to FIG. 2, in disassembling and reassembling operation, it is convenient that the base member 12 is tuned with respect to the detachable molding member 13 so that the screw rod 121 is released from the screw hole 131, or mounted thereto.

After molding, the injection-molding tool 10 and the golf club grip 20 are drawn out from the mold assembly (not shown) and thus a molded product of the golf club grip 20 is removed from the injection-molding tool 10. A finished product of the golf club grip 20 can be carried out in following steps of a finishing process.

Construction of the molded product of the golf club grip 20 shall be described in detail, referring again to FIG. 3. Preferably, the golf club grip 20 is made of rubber, elastic material or the likes. The golf club grip 20 is a tapered hollow body that includes a closed end 21, a central aperture 22 and a plurality of buffer through-holes 23. The central aperture 22 is arranged on the closed end 21 and provided with a passage connecting to an interior of the golf club grip 20. Also, the buffer through-holes 23 are arranged on the closed end 21 to thereby attenuate vibration for striking, and equi-spaced around the central aperture 22. When a user holds the golf club grip 20 and strikes a golf ball (not shown), a minimized vibration can transmit to the user's hand.

Figure 4:
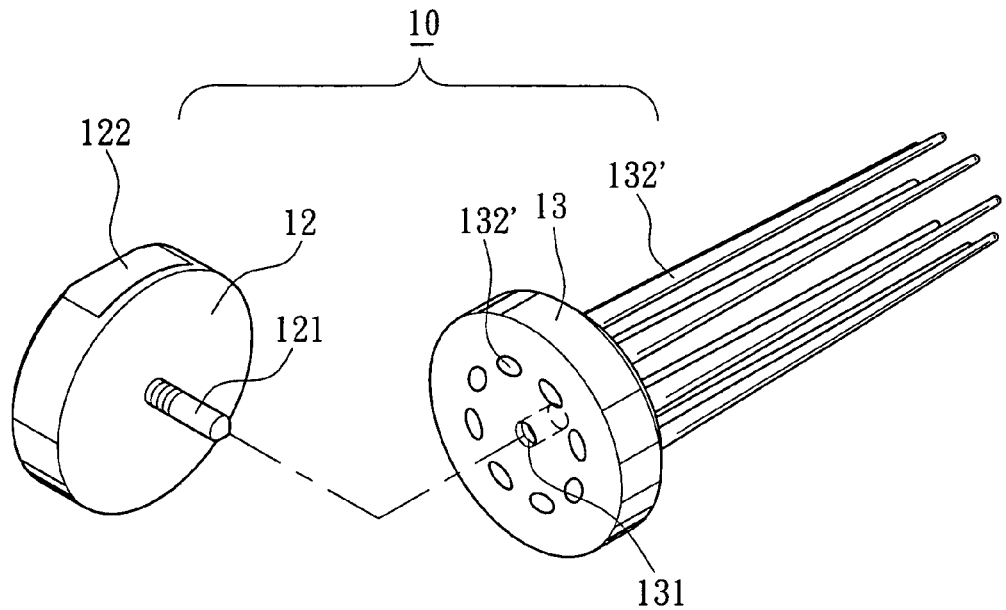
FIG. 4 is an exploded perspective view of an injection-molding tool for a golf club grip in accordance with a second embodiment the present invention.

Turning to FIG. 4, an injection-molding tool 10 for a golf club grip in accordance with a second embodiment of the present invention includes a base member 12 and a detachable molding member 13 attached thereto. In comparison with the first embodiment, each of the molding plugs 132' of the second embodiment has an oval cross-sectional configuration. The oval cross-sectional configuration of the buffer through-hole is able to provide with a greater deformation for attenuating vibration.

Figure 5:
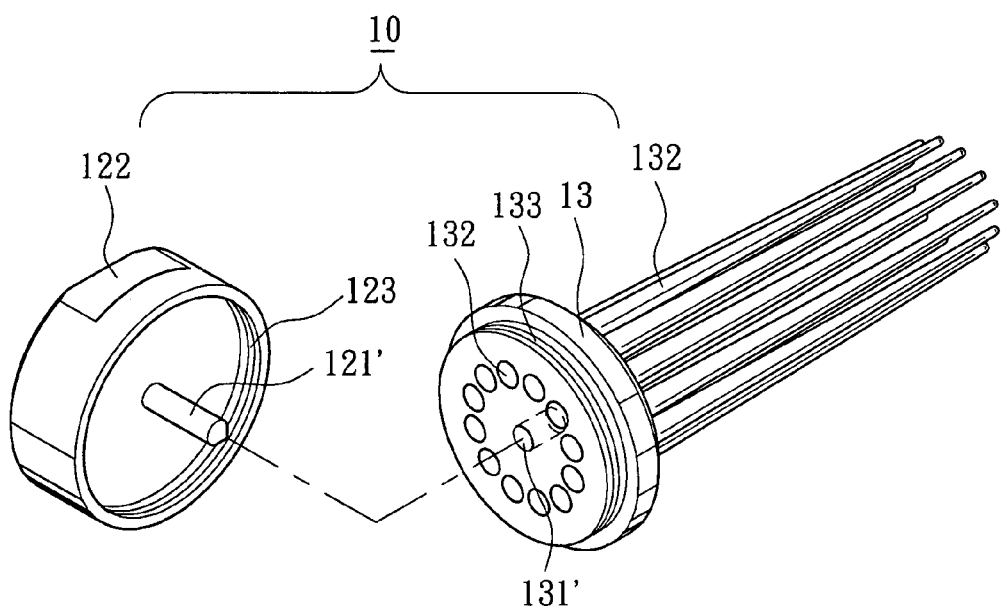
FIG. 5 is an exploded perspective view of an injection-molding tool for a golf club grip in accordance with a third embodiment the present invention.
Figure 6:
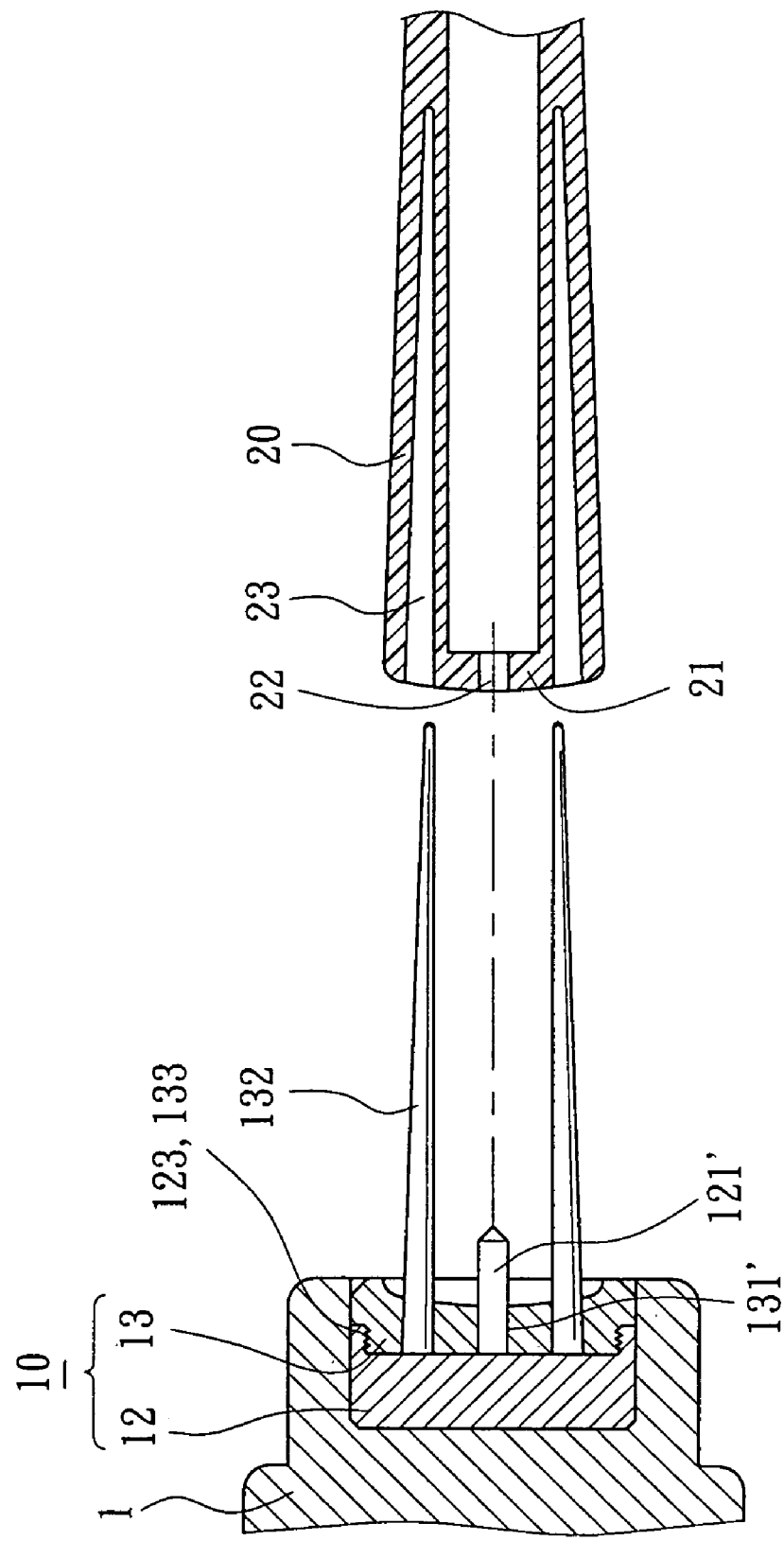
FIG. 6 is an exploded cross-sectional view of the injection-molding tool drawing out the golf club grip in accordance with the third embodiment of the present invention.

Referring further to FIGS. 5 and 6, an injection-molding tool 10 for a golf club grip in accordance with a third embodiment of the present invention includes a base member 12 and a detachable molding member 13 attached thereto. In comparison with the first embodiment, the base member 12 of the third embodiment further includes an axial rod 121', a cut portion 122 and a first thread portion 123. Correspondingly, the bottom seat of the detachable molding member 13 includes an assembling hole 131' adapted to receive the axial rod 121' of the base member 12, and a second thread portion 133 for screw connection with the first thread portion 123 of the base member 12. Preferably, first the thread portion 123 is formed on an inner circumferential wall of the base member 12. Also preferably, the second thread portion 133 is formed on an outer circumferential wall of the detachable molding member 13.

Referring again to FIG. 6, in assembling operation, the first thread portion 123 of the base member 12 is engaged with the second thread portion 133 of the detachable molding member 13 so that the assembled relationship of the base member 12 and the detachable molding member 13 are assured. The axial rod 121' of the base member 12 has a distal end extended through the assembling hole 131' of the detachable molding member 13 and located among the molding plugs 132 of the detachable molding member 13.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An injection-molding tool for a golf club grip, said tool being applied to an injection-molding machine, comprising:
    a base member including an axial rod with a distal end, and a connection means; and
    a detachable molding member attached to the base member to further constitute the injection-molding tool, whereby the distal end of the axial rod extends through an assembling hole, the assembling hole being adapted to receive the axial rod, and a plurality of molding plugs extending therefrom;
    wherein the connection means of the base member allows for the disassembly and reassembly of the detachable molding member so that the detachable molding member is able to change according to design choice of the golf club grip.

2. The injection-molding tool for a golf club grip as defined in claim 1, wherein the axial rod of the base member is formed with a screw rod and regarded as the connection means of the base member, and the assembling hole of the detachable molding member is formed with a screw hole for screw connection with the screw rod of the base member.

3. The injection-molding tool for a golf club grip as defined in claim 1, wherein the base member is provided with a first thread portion, and the detachable molding member is provided with a second thread portion for screw connection with that of the base member.

4. The injection-molding tool for a golf club grip as defined in claim 3, wherein the first thread portion of the base member is formed on an inner circumferential wall of the base member while the second thread portion of the detachable molding member is formed on an outer circumferential wall of the detachable molding member.

5. The injection-molding tool for a golf club grip as defined in claim 1, wherein the detachable member includes a bottom seat on which the molding plugs are equi-spaced.

6. The injection-molding tool for a golf club grip as defined in claim 1, further comprising a cutting portion for positioning the injection-molding tool with respect to the injection-molding machine.

7. The injection-molding tool for a golf club grip as defined in claim 1, wherein each of the molding plugs has a circular cross-sectional configuration.

8. The injection-molding tool for a golf club grip as defined in claim 1, wherein each of the molding plugs has an oval cross-sectional configuration.

9. The injection-molding tool for a golf club grip as defined in claim 1, wherein the distal end of the axial rod of the base member is extended through the assembling hole of the detachable molding member and located among the molding plugs.

\* \* \* \* \*